US008548418B1

(12) United States Patent
Jintaseranee et al.

(10) Patent No.: US 8,548,418 B1
(45) Date of Patent: Oct. 1, 2013

(54) METHODS AND DEVICES FOR DISTRIBUTING RINGTONE

(75) Inventors: Kosol Jintaseranee, Sunnyvale, CA (US); Soshant Bali, Menlo Park, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 259 days.

(21) Appl. No.: 12/693,035

(22) Filed: Jan. 25, 2010

(51) Int. Cl.
*H04M 9/00* (2006.01)

(52) U.S. Cl.
USPC .... 455/401; 455/415; 455/412.1; 379/207.16

(58) Field of Classification Search
USPC ............................ 455/415, 412.2, 412.1, 401
See application file for complete search history.

(56) References Cited

U.S. PATENT DOCUMENTS

| | | | |
|---|---|---|---|
| 6,801,521 B1 | 10/2004 | Shaffer et al. | |
| 7,602,901 B1 | 10/2009 | Kates et al. | |
| 2004/0120494 A1 | 6/2004 | Jiang et al. | |
| 2004/0213401 A1* | 10/2004 | Aupperle et al. | 379/372 |
| 2004/0223605 A1 | 11/2004 | Donnelly | |
| 2005/0079861 A1 | 4/2005 | Lim | |
| 2006/0245571 A1 | 11/2006 | Radziewicz et al. | |
| 2006/0291638 A1 | 12/2006 | Radziewicz et al. | |
| 2007/0116253 A1 | 5/2007 | Batni et al. | |
| 2007/0121657 A1 | 5/2007 | Boillot et al. | |
| 2007/0190983 A1* | 8/2007 | Goldfarb et al. | 455/414.1 |
| 2007/0206736 A1* | 9/2007 | Sprigg et al. | 379/88.21 |
| 2007/0211872 A1 | 9/2007 | Cai et al. | |
| 2007/0263798 A1 | 11/2007 | Dewing et al. | |
| 2008/0057902 A1* | 3/2008 | Sidon | 455/401 |
| 2010/0005059 A1* | 1/2010 | Banerjee et al. | 707/3 |
| 2010/0046732 A1 | 2/2010 | James et al. | |
| 2010/0202604 A1* | 8/2010 | Siegel | 379/207.16 |
| 2010/0254372 A1 | 10/2010 | Keller et al. | |

FOREIGN PATENT DOCUMENTS

WO  WO 01/41411  6/2001

OTHER PUBLICATIONS

U.S. Appl. No. 12/258,947, filed Oct. 27, 2008.

* cited by examiner

*Primary Examiner* — Vladimir Magloire

(57) ABSTRACT

Methods and systems for distributing ringtones are provided. A callee device, such as a cellular telephone, may receive an association request, via a communication network, that contains a reference to a ringtone and an identifier of a caller device. In response to receiving the association request, the callee device may form an association between the ringtone and the caller device. Then, upon receiving an indication that the caller device has initiated a call to the callee device, the callee device may play out the ringtone.

18 Claims, 6 Drawing Sheets

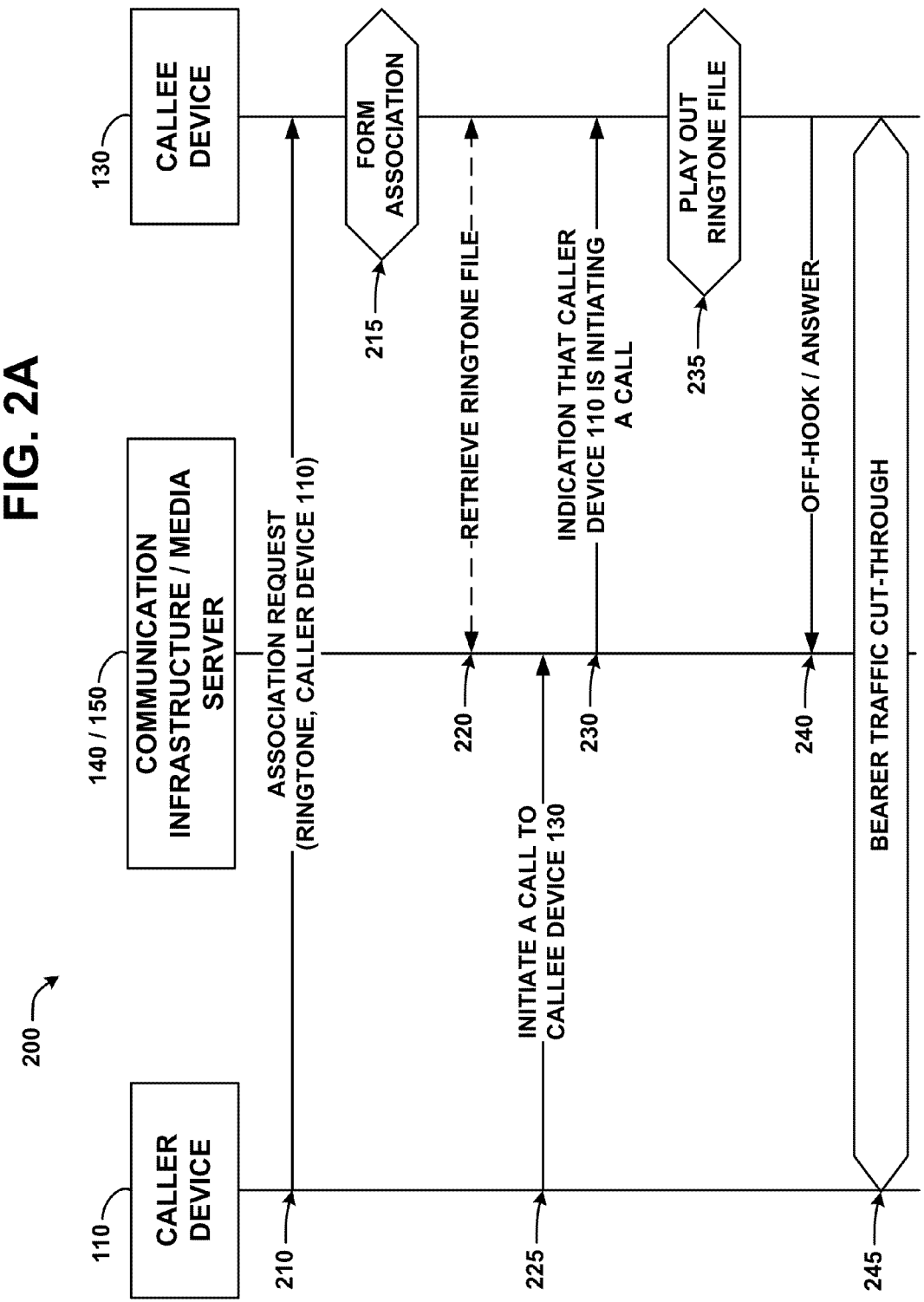

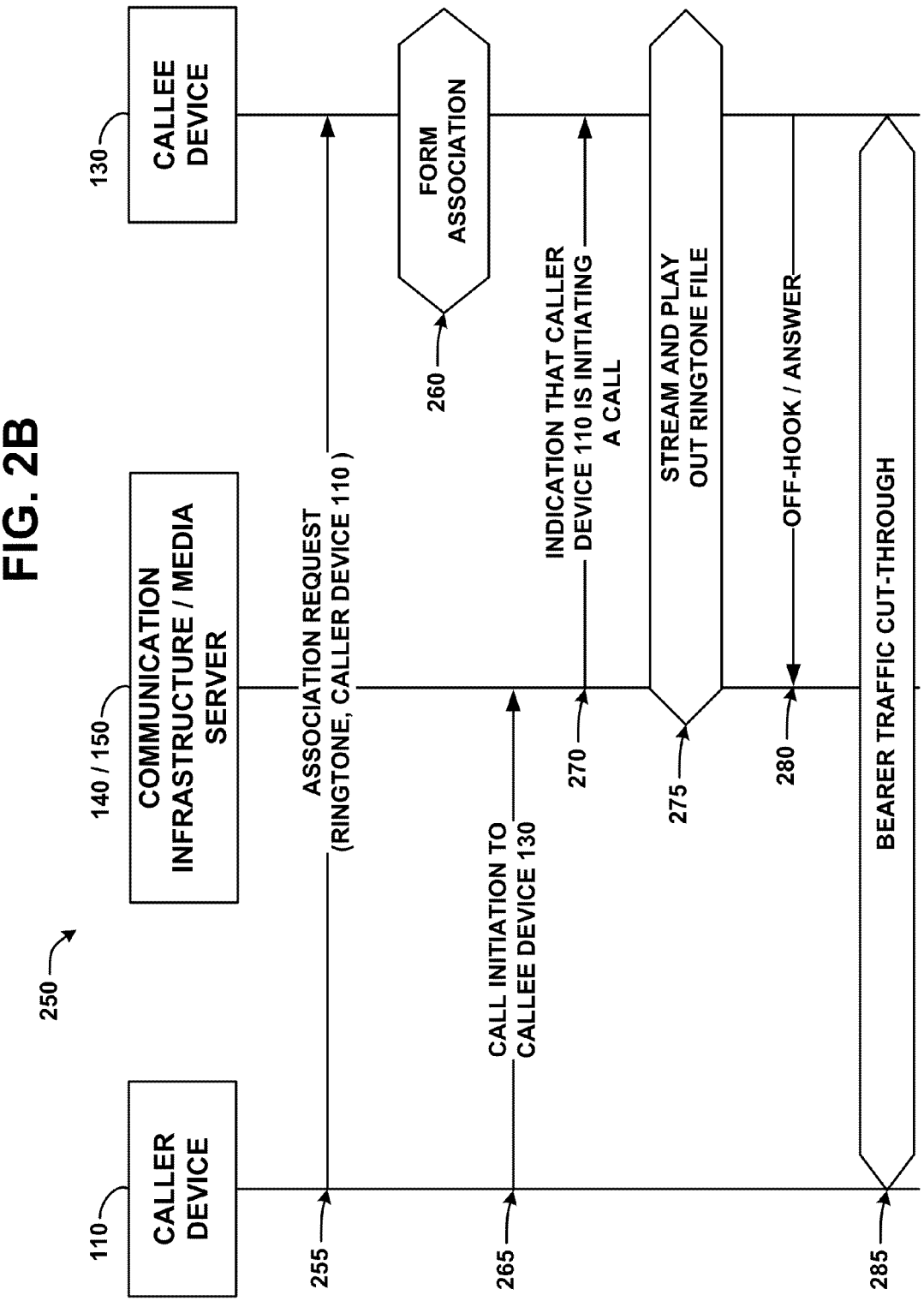

| CALLER | RINGTONE |
|---|---|
| 800-555-1001 | RDNZL.MP3 |
| 800-555-1002 | HTTP://WWW.MMS.ORG/UPRISING.MP3 |
| 8005551003@IMS.COM | DEFAULT |
| SIP:ALICE@ABC.COM | POKER.MP3 |
| 800-555-1004 | POKER.MP3 |

# METHODS AND DEVICES FOR DISTRIBUTING RINGTONE

BACKGROUND

In telephony systems, such as the public switched telephone network (PSTN), a ringtone is an audible signal made by a callee device to indicate an incoming call. Typically, the callee device plays the ringtone after the callee device is alerted of an incoming call from a caller device, but before the incoming call is answered.

In recent years, personalized ringtones have become popular. This feature allows the user of a callee device to specify audio selections for various callers, so that the caller device plays a specific ringtone when the callee device receives an incoming call from a particular caller device. These audio selections can take any form, but are usually based on audio clips or files of content such as popular music, speeches, or sound effects.

Personalized ringtones can be used with both wireline communication devices, such as desktop phones, and wireless communication devices, such as cell phones. Regardless of the type of device, in these traditional systems, the ringtone is typically of low quality and is chosen by the user of the callee device and stored locally on the callee device.

OVERVIEW

In contrast to the traditional method of associating a ringtone with a caller device, where a user of a callee device specifies the association on the callee device, the methods and devices herein allow the caller device to specify the association on the callee device. Allowing a caller device to do so is a potentially engaging feature that adds social networking capabilities to telephony devices. Through the embodiments herein, a user of a caller device can specify the ringtone that gets played out when he or she calls the callee device. This ringtone might be humorous, or have a special meaning between the user of the caller device and the user of the callee device. The user of the caller device may change the ringtone from time to time, and these changes might have the result of entertaining or surprising the user of the callee device.

However, the user of the callee device might want to have power over who can specify ringtones played on the callee device. Thus, the user of the callee device may define a trust group of caller devices that can specify ringtones to be played out on the callee device. Then, when the callee device receives an association request containing a reference to a ringtone and an identifier of a caller device, the callee device may automatically form an association between the ringtone and the caller device only if the caller device is in the trust group.

Once an association exists between a caller device and a ringtone, then when the callee device receives an incoming call from the caller device, the callee device may play out the ringtone specified and/or provided by the caller device. This ringtone may be stored locally on the callee device, or a media server may stream the ringtone to the callee device.

Accordingly, in an exemplary embodiment, a callee device and a caller device may be communicatively coupled by a communication infrastructure. The communication infrastructure may include a media server that stores ringtone files. The callee device may receive an association request that contains a reference to a ringtone and an identifier of the caller device. In response to receiving the association request, the callee device may form an association between the ringtone and the caller device. Preferably, this association relates the ringtone to at least one particular phone number, address or identifier of the caller device. Then, when the callee device determines that it is receiving an incoming call from the phone number, address or identifier of the caller device, the callee device responsively plays out the ringtone.

This exemplary embodiment includes scenarios wherein the caller device transmits the ringtone in the form of a file along with the association request, so that the callee device can locally store and play out the file containing the ringtone. Alternatively, the caller device may transmit an address along with the association request, the address being a network location (e.g., the media server) from which the callee device can download or stream the ringtone. Then, the callee device may either download the ringtone prior to determining that it is receiving an incoming call from the caller device, or play out the ringtone at any time by requesting and receiving a stream of the ringtone from the address.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 2A is a call flow in accordance with a preferred embodiment;

FIG. 2B is another call flow in accordance with a preferred embodiment;

DESCRIPTION

When personalized ringtones were initially deployed, desktop phones and cell phones had relatively little data storage (e.g., little memory), little processing power, and low-speed network connections. Thus, it was not an option to dynamically supply high-quality ringtones to these devices for storage or playing out. Even if the devices could receive and store high-quality ringtone files, they would not have had the processing power or program logic to play out the high-quality ringtone files.

The advent of high speed networks and powerful endpoint devices has the potential to change the landscape of personalized ringtones. Modern callee devices that support Voice over Internet Protocol (VoIP) typically have always-on data connections upon which these devices can conduct VoIP calls, and also receive ringtone files or streams. These devices may also be provisioned with gigabytes of storage, significant processing power, high-resolution displays, and high-quality speakers. Thus, it is possible for a high-quality audio, video, or multimedia file to be received or streamed out-of-band (e.g., not on a voice bearer channel) from a media server to such a callee device for playout as a ringtone.

Accordingly, disclosed herein are methods and devices for distribution of ringtones. Preferably, a callee device may receive an association request containing a reference to a ringtone and an identifier of a caller device, and associates the ringtone with the caller device. Then, when the caller device initiates a call to a callee device, the callee may play out this ringtone.

I. Network Architecture

Figure 1:
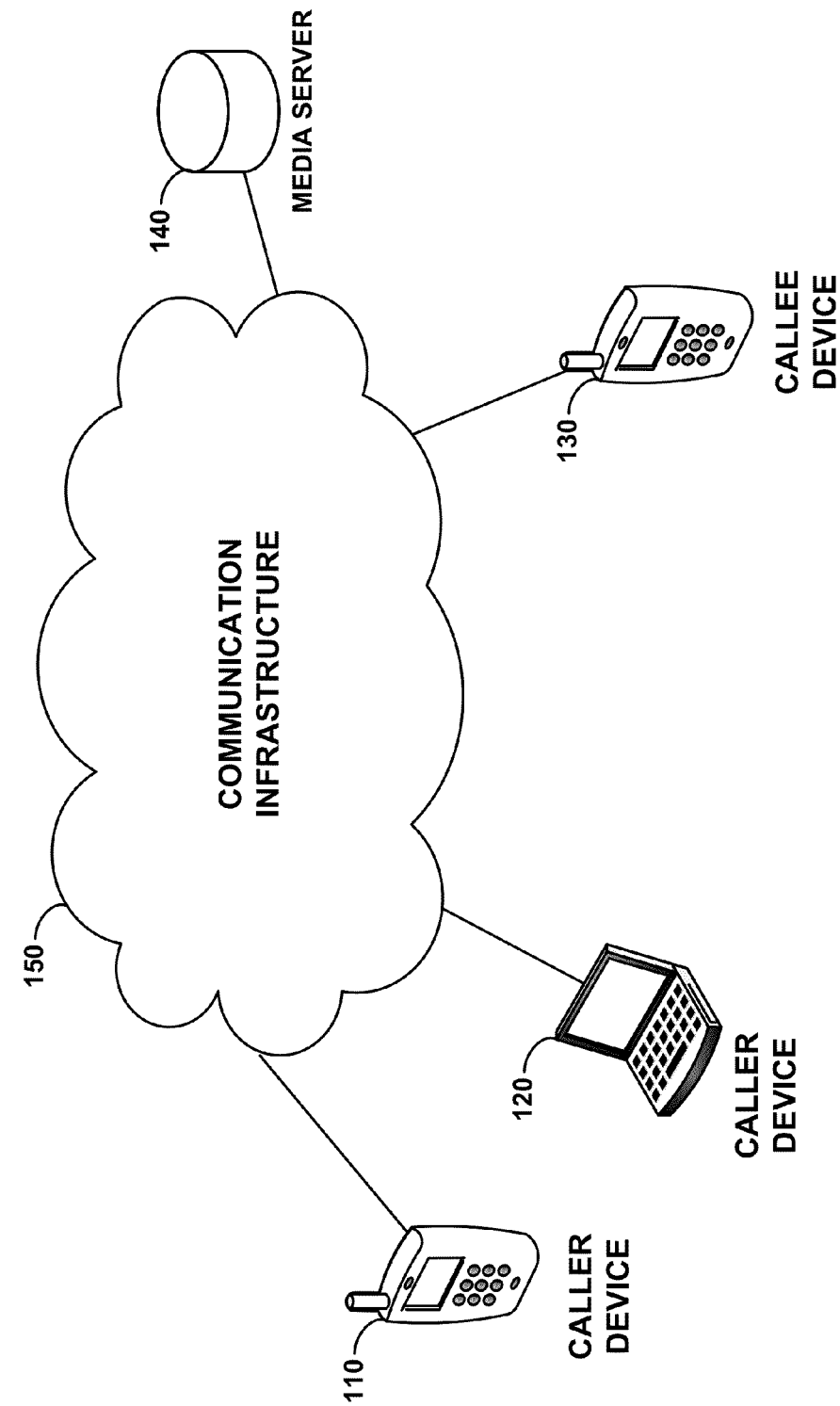
FIG. 1 depicts a communication system in accordance with a preferred embodiment.

FIG. 1 is a simplified block diagram of an exemplary system 100 for distribution of ringtone files. Exemplary system 100 includes a caller device 110, another caller device 120, and a callee device 130. These three devices are preferably wireline or wireless communication devices. Despite their designations as "caller" or "callee" in FIG. 1, it should be understood that each of these devices may be capable of both initiating and receiving calls over communication infrastructure 150, and that these designations of caller and callee are for purposes of simplicity and to provide context for the discussion that follows.

Communication infrastructure 150 preferably allows caller device 110, callee device 120, and callee device 130 to communicate with one another. This linkage between the devices and the communication infrastructure may include signaling linkages, bearer traffic linkages, or both. Thus, the devices need not be transmitting or receiving bearer traffic in order to be communicatively coupled to the communication infrastructure. In other words, devices that are idle or otherwise only communicating to the communication infrastructure via signaling channels remain communicatively coupled to the communication infrastructure. Furthermore, communication infrastructure 150 preferably includes media server 140. However other arrangements are possible, and exemplary system 100 may include more or fewer devices than shown in FIG. 1.

In particular, communication infrastructure 150 may include various IP Multimedia Subsystem (IMS) devices, including but not limited to one or more call session control functions (CSCFs), signaling gateways (SGWs), media gateway control function (MGCFs), home subscriber servers (HSSs), as well as various application servers and/or downloadable application logic. The IMS is designed enable IP multimedia services for both wireline and wireless devices by logically separating access layers from services layers. In this way, client devices can utilize various IMS services regardless of through what means the client device is attached to an IP network.

IMS signaling and call control are largely standardized around the Session Initiation Protocol (SIP), while multimedia bearer traffic typically uses the Real Time Protocol (RTP). The IMS also leverages other protocols developed by the Internet Engineering Task Force (IETF), such as the Session Description Protocol (SDP) and DIAMETER. These common protocols support applications including VoIP, push to talk (PTT), video over IP, gaming, audio and video streaming, and other multimedia services. Additionally, an IMS infrastructure may support instant messaging, presence, email and social networking applications. Accordingly, given the broad range of applications that can be supported by an IMS infrastructure, any of these IMS devices may be involved with, in part or in whole, any of the methods for distributing ringtone described herein.

Devices in system 100, including caller device 110, callee device 120, callee device 130, and media server 140 may each contain at least one central processing unit, data storage, input/output interface, wireline or wireless network interface, and possibly other components and peripheral devices as well. The characteristics and functions of each of these elements are described at a high level in the following subsections. However, the descriptions in these subsections are merely introductory and should not be interpreted to limit the characteristics and functions of these devices.

Accordingly, it should be understood that this and other arrangements and processes described herein are set forth for purposes of example only, and other arrangements and elements (e.g., machines, interfaces, functions, orders of elements, etc.) can be added or used instead and some elements may be omitted altogether. Further, as in most communication architectures, those skilled in the art will appreciate that many of the elements described herein are functional entities that may be implemented as discrete components or in conjunction with other components, in any suitable combination or location.

a. Communication Devices

Caller device 110, caller device 120, and callee device 130 could be wireline telephones, wireless telephones, personal computers, servers, personal digital assistants, or another type of wired or wireless device. Preferably, these communication devices are subscriber devices, and are manipulated by a human in order to establish voice, video, and/or multimedia calls with one another and with other devices. However, these devices could also be automated devices without a human interface.

Caller device 110, caller device 120, and callee device 130 preferably execute at least one communication application, such as a VoIP application or a PSTN application. Callee device 130 may further contain data storage to store one or more ringtone files, and processing logic to play out these ringtone files when receiving an incoming call, such as a VoIP call, from a caller device.

The ringtone files described herein may conform to various types of standard or proprietary audio, video, or multimedia formats, including Motion Pictures Experts Group (MPEG®) Audio Layer 3 (MP3®), Free Lossless Audio Codec (FLAC®), Advanced Audio Coding (AAC®), Waveform Audio Format (WAV®), Windows Media Audio (WMA®), Ogg Vorbis, Real Audio®, Audio Video Interleave (AVI®), and so on. Furthermore, callee device 130 may also comprise a speaker and/or a video screen to facilitate playout of these ringtone files when receiving an incoming call or at other times.

b. Communication Infrastructure

Communication infrastructure 150 is preferably one or more networks that support access from wireline devices, wireless devices, or both. As such, communication infrastructure 150 may contain various types of routers, switches, gateways, firewalls, and servers. These elements, as well as caller device 110, caller device 120, and callee device 130, may be coupled by wireline communication link technologies such as Ethernet, Token Ring, Synchronous Optical Networking (SONET), Asynchronous Transfer Mode (ATM), digital subscriber line (DSL), broadband cable television, or one or more of the various T-carrier systems. However, these elements may also, or alternatively, be coupled by wireless technologies, such as 802.11 (Wifi), BLUETOOTH®, Code Division Multiple Access (CDMA), Global System for Mobile communications (GSM), the $3^{rd}$ Generation Partnership Program (3GPP) Long Term Evolution (LTE®), IDEN®, or Worldwide Interoperability for Microwave Access (WIMAX®).

Communication infrastructure 150 may also contain devices that enable traditional circuit-switched voice telephony, VoIP, push to talk (PTT), multimedia calling and conferencing, audio or video streaming, gaming, or other audio, video, or multimedia applications. In order to facilitate a range of services, communication infrastructure 150 may comprise multiple physical and/or logical components associated with multimedia services. For example, communication infrastructure 150 may include one or more of the following: a call session control function, a signaling gateway, a media gateway control function, a media gateway, a home subscriber server, as well as various application servers and/or downloadable application logic. Furthermore, communication infrastructure 150 may include one or more connections to the public Internet and/or private IP networks, or may itself be distributed across various physical or topological locations on the public Internet and/or private IP networks.

c. Media Server

Media server 140 may be a standalone or integrated device, and may be communicatively coupled to communication infrastructure 150, as shown in FIG. 1. Alternatively, media server 140 may be part of communication infrastructure 150. Media server 140 may be a personal computer, a standalone server, a blade server, a database, or another type of device. Media server 140 may take the form of a single physical device, or may be divided into multiple logical components spanning a number of physical devices.

Preferably, media server 140 is capable of storing a number of ringtone files. Additionally, media server 140 may provide uniform resource locators (URLs) to uniquely identify and locate at least some of these files. Thus, media server 140 may support access to these URLs via a standard protocol, such the Hypertext Transfer Protocol (HTTP), Hypertext Transfer Protocol over Secure Sockets Layer (HTTPS), instant messaging, a variation of such a standard protocol, or a proprietary protocol. Furthermore, a non-IP protocol, such as short messaging service (SMS) or multimedia messaging service (MMS), may also be used to refer to the locations of these files.

To this end, media server 140 may be capable of executing a world-wide web (WWW) server, file transfer protocol (FTP) server, or another type of server that can serve as a delivery mechanism for ringtone files. Furthermore, media server 140 may facilitate the transfer of ringtone files to callee devices and/or facilitate the streaming of ringtone files to callee devices.

II. Exemplary Operation

The following embodiments involve a callee device, such as callee device 130, receiving an association request that contains a reference to a ringtone and an identifier of a caller device. In response to receiving the association request, the callee device may form an association between the ringtone and the caller device. Then, upon receiving an indication that the caller device has initiated a call to the callee device, the callee device may use the established association as a basis to trigger playout of the ringtone.

Other network elements can be involved in these transactions without departing from the scope of these embodiments. Furthermore, these embodiments depict respective sequences of steps occurring between devices and a communication infrastructure, but each respective sequence of steps may occur in a different order, and fewer or more steps may be used also without departing from the scope of the embodiments. Moreover, these embodiments may be combined with one another, in whole or in part.

For purposes of convenience and simplicity, in FIGS. 2A and 2B, media server 140 and communication infrastructure 150 are represented as a single logical entity. Notwithstanding this representation, media server 140 and communication infrastructure 150 may be physically or logically separated or combined. Furthermore, only a single caller device, caller device 110, is represented in FIGS. 2A and 2B. Nonetheless, other caller devices, such as caller device 120, may also communicate in a similar manner with callee device 130.

In FIG. 2A, call flow 200 involves caller device 110, callee device 130, and communication infrastructure 150. At step 210, caller device 110 transmits an association request to callee device 130. Preferably, the association request contains a reference to a ringtone and an identifier of the caller device. The reference to the ringtone may take the form of an actual ringtone file, or an address (e.g., an address of media server 140) from which callee device 130 can access the ringtone. The identifier may be a phone number, International Mobile Subscriber Identifier (IMSI), serial number, IP address, hardware address, network access identifier (NAI), email address, SIP uniform resource identifier (URI), or some other means of identifying caller device 110 or a user of caller device 110.

An association request, such as the association request of step 210, may contain references to multiple ringtone-address pairs. For instance, caller device 110 may be a cellular telephone of a given user. The given user might also subscribe to telephony services with a landline telephony device. Therefore, the given user might want to specify one ringtone to be played out when he or she calls callee device 130 from caller device 110, and another (or the same) ringtone to be played out when he or she calls callee device 130 from the landline telephony device. When receiving a single association request with multiple ringtone-address pairs, callee device 130 may form multiple ringtone-address associations from the single association request.

It should be understood that after forming the association, callee device 130 may transmit an acknowledgement message to caller device 110. This acknowledgment message may serve to notify caller device 110 that callee device 130 has formed the association. On the other hand, if callee device 130 fails to form the association for any reason, callee device 130 may transmit a negative acknowledgement message to caller device 110, notifying caller device 110 of the failure to form the association. While these acknowledgement and negative acknowledgement messages are not shown in FIG. 2A, they may take on various formats and may be transmitted at various times. For instance, callee device 130 may transmit an acknowledgement or negative acknowledgement message at any point after step 210, including before step 215, between step 215 and step 220, after step 220, and so on.

At step 215, in response to receiving the association request, callee device 130 may form an association between the ringtone and caller device 110. Furthermore, callee device 130 may store this association for later reference. However, before forming or storing the association, callee device 130 may determine if caller device 110 is in a trust group defined for callee device 130. If caller device 110 is in the trust group, the association may be automatically formed. If caller device 110 is not in the trust group, then the association might not be formed. That is, formation of the association may be conditioned on the caller device being in a trust group defined for the callee device.

A trust group may be represented and implemented in various ways. For instance, a user of callee device 130 may be able to define a trust group on callee device 130. Alternatively or additionally, the user of callee device 130 may be able to define a trust group via a networked server, with this server later transmitting a definition of the trust group to callee device 130. Preferably, a trust group contains, for example, a list of devices that are deemed to be trusted by callee device 130, so that callee device 130 will automatically associate ringtone references transmitted by a given device in the trust group to that given device. The devices in the list may by specified by any appropriate identifier, including but not limited to a phone number, an IMSI, a serial number, an IP address, a hardware address, an email address, an NAI or a SIP URI. Alternatively, a trust group may be formed automatically based on, for example, an established instant messaging or push-to-talk "buddy list," or the mere presence of a caller device's identifier in an address book of callee device 130.

Moreover, trust groups can be based on lists of contacts from social networking sites. Many social networking sites, such as FACEBOOK®, LINKEDIN®, or MYSPACE®, allow individuals to share personal information with their contacts, or "friends." This information may include caller device identifiers, such as phone numbers. Thus, a user of callee device 130 may download, or otherwise provision, callee device 130 with at least some of the profile information of one or more social networking contacts. Once so provisioned, callee device 130 may add the caller device identifiers of these contacts to a trust group. In this way, the user's social networking contacts can trigger callee device 130 to automatically associate their caller device identifiers with a ringtone.

Thus, callee device 130 may receive and process the association request transparently to the user of callee device 130. On the other hand, this receiving and processing may occur with the user's knowledge, and/or with the user's explicit or implicit permission. For example, if caller device 110 is not in the trust group or if a trust group is not defined for callee device 130, callee device 130 may present its user with the option of accepting or rejecting the association, thereby allowing the user to control whether the ringtone is associated with caller device 110. However, even if caller device 110 is in the trust group, callee device 130 may still present its user with the option of accepting or rejecting the association.

Regardless of whether an association was automatically formed or formed with the approval of the user of callee device 130, the ringtone specified for such the association may later be overridden by the user. Thus, for instance, the user of callee device may discover that caller device 110 has been automatically associated with a particular ringtone. The user may then change the association to specify a different ringtone.

If callee device 130 receives an address instead of a ringtone file at step 210, callee device 130 may retrieve the ringtone file at step 220. This retrieval step is optional, and may involve callee device transmitting a request for the ringtone file to the address, and then receiving the ringtone file from the address. In particular, if the address is associated with media server 140, then media server 140 may receive the request and transmit a copy of the ringtone file to callee device 130. Step 220 is also optional because, if callee device 130 already has a copy of the ringtone file, callee device 130 may refrain from downloading another copy of the ringtone file. For instance, multiple caller devices may be associated with the same ringtone, and callee device 130 may associate the same ringtone file with each caller device without having to download the ringtone file more than once.

Since ringtone files may be quite large (e.g., several megabytes or more) callee device 130 may attempt to conserve the capacity of communication network 150 by scheduling step 220 to occur when communication network 150 is expected to have low utilization. For instance, if callee device 130 receives the association request of step 210 during a busy hour of communication network 150 (e.g., during normal business hours) and the reference to the ringtone is in the form of an address, callee device 130 may wait several hours (e.g., until an overnight hour when network utilization is traditionally low) before retrieving the ringtone file. On the other hand, if callee device 130 determines that communication network 150 has sufficient capacity to rapidly deliver the ringtone file, callee device 130 may perform step 220 during or immediately after step 215.

At step 225, which may take place an arbitrary amount of time after step 215 and/or step 220 take place, caller device 110 may transmit a request to initiate a call to callee device 130. This request may be transmitted directly to callee device 130, or as shown in FIG. 2A, may pass through communication infrastructure 150. Accordingly, at step 230, communication infrastructure 150 transmits, to callee device 130, an indication that caller device 110 is initiating a call to callee device 130.

At step 235, callee device 130 plays out the ringtone. This step may occur in response to callee device 130 receiving the indication at step 230. This step may also be based on callee device 130 otherwise determining that it is being called by caller device 110, and that the association formed at step 215 associates caller device 110 with the ringtone.

If the ringtone is in an audio form, this playing out may take the form of producing an audio signal from the ringtone file. For instance, if the ringtone is an MP3® file, callee device 130 may play the MP3® file via a speaker, thereby producing an audible signal. On the other hand, if the ringtone is in a form that includes video content, callee device 130 may play out the ringtone by producing a representation of the video content on a screen of callee device 130. It should be understood that ringtones can include audio, video, still images, text, other types of media, or any combination thereof. Thus, callee device 130 may play out such a ringtone using any appropriate type of output mechanism. For instance, a ringtone may include a command to make callee device 130 vibrate, and callee device 130 may vibrate appropriately when playing out such a ringtone.

Regardless of the exact form or format of the ringtone and how it gets played out, callee device 130 preferably plays out the ringtone for a period of time so that a user of callee device 130 has an opportunity to answer the incoming call. If the user answers the incoming call, then at step 240, callee device 130 may transmit an off-hook or answer message to communication infrastructure 150. This off-hook or answer message preferably serves to notify communication infrastructure 150 that callee device 130 has accepted the incoming call. Then, at step 245, communication infrastructure 150 may connect or "cut through" a bearer traffic channel between caller device 110 and callee device 130. Alternatively, steps 240 and 245 may take place only between caller device 110 and callee device 130. For instance, caller device 110 may transmit the request to initiate the call directly to callee device 130, which in turn may trigger callee device 130 to play out the ringtone associated with caller device 110.

Preferably, callee device 130 stops playing out the ringtone when the user answers the call. Furthermore, the bearer traffic flow of step 245 may be unidirectional, such as from callee device 130 to caller device 110 or from caller device 110 to callee device 130, or bidirectional between caller device 110 and callee device 130.

If a user of callee device 130 does not answer the incoming call within the period of time, callee device 130 may eventually cease playing out the ringtone. In this case, caller device 110 may be redirected to a message recording service, such as a voicemail or video mail service, so that a user of caller device 110 can leave a message for a user of callee device 130.

It should be appreciated that current telephony devices may support at least two different types of network technologies. For example, most of today's cellular telephones can access a traditional circuit-switched network to participate in circuit-switched voice calls. These cellular telephones may also be able to access a packet-switched network for data-oriented services, such as messaging and Internet access. However, for the most part, these devices may only be able to access one of these types of network technologies at a time. Furthermore, these while these devices may be capable of using voice (e.g., VoIP) services via the packet-switched network, by default they may use the circuit-switched network for voice services instead. Examples of reasons for preferring circuit-switched voice calling over packet-switched voice calling include circuit-switched networks being widely deployed, optimized for voice traffic, and potentially not yet fully-amortized.

Thus, one possible embodiment of call flow 200 would be for the messages of steps 210 and 220 to be transmitted over a packet-switched network, while the messages of steps 225, 230, 240, and 245 are transmitted over a circuit-switched network. Of course, other embodiments of call flow 200 are possible.

New and emerging telephony devices, including co-called "fourth generation" or "4G" wireless devices, may differ from current telephony devices. In particular, 4G devices may only support access to packet-switched networks, or may prefer using packet-switched networks over circuit-switched networks for voice services. Thus, 4G devices may have always-on connections to packet-switched networks, thereby allowing these devices to conduct voice services and data services simultaneously.

FIG. 2B provides call flow 250, which is a variation of call flow 200 that could be used if callee device 130 supports simultaneous voice and data. At step 255, caller device 110 may transmit an association request to callee device 130. Preferably, the association request contains a reference to a ringtone and an identifier of the caller device. In this scenario, the reference to the ringtone may take the form of an address (e.g., an address of media server 140) from which callee device 130 can access the ringtone.

Like in call flow 200, callee device 130 may transmit an acknowledgement or negative acknowledgement message to caller device 110 in response to receiving the association request of step 255. These messages make take on various formats and may be transmitted at various times. For instance, callee device 130 may transmit an acknowledgement or negative acknowledgement message at any point after step 255, including before or after step 260.

At step 260, in response to receiving the association request, callee device 130 may form an association between the ringtone and caller device 110. Furthermore, callee device 130 may store this association for later reference. At step 265, which may take place an arbitrary amount of time after step 260 takes place, caller device 110 may transmit a request to initiate a call to callee device 130. This request may be transmitted directly to callee device 130, or as shown in FIG. 2B, may pass through communication infrastructure 150. Assuming the latter, at step 270, communication infrastructure 150 transmits, to callee device 130, an indication that caller device 110 is initiating a call to callee device 130.

At step 275, callee device 130 initiates streaming of the ringtone from the address specified in the association request. This step may involve callee device 130 transmitting a request for ringtone streaming to the address, and then receiving a stream of the ringtone from the address. It should be understood that "streaming" media from a first device to a second device preferably allows the second device to begin playout of the streamed media before all of the streamed media is received. Thus, if the ringtone streamed at step 275 is stored, in for instance, the form of an audio file, callee device 130 may receive an initial part of this audio file and begin playing out the initial part while callee device 130 is still receiving subsequent parts of the audio file. Streaming also allows callee device 130 to receive and store the entire audio file, or to discard parts of the audio file as or after these parts are played out. Thus, also at step 275, callee device 130 may play out the ringtone while the ringtone is being streamed. An advantage of streaming ringtone over locally storing ringtone is that streaming avoids requiring that callee device 130 store ringtone locally.

Similar to call flow 200, callee device 130 preferably plays out the ringtone for a period of time so that a user of callee device 130 has an opportunity to answer the incoming call. If the user answers the incoming call, then at step 280, callee device 130 may transmit an off-hook or answer message to communication infrastructure 150. Then, at step 285, communication infrastructure 150 may connect or "cut through" a bearer traffic channel between caller device 110 and callee device 130. Alternatively, steps 280 and 285 may take place only between caller device 110 and callee device 130.

In both call flows 200 and 250, various devices and systems, including but not limited to caller device 110, callee device 130, media server 140, and communication infrastructure 150, may use various circuit-switched and/or packet-switched protocols to facilitate distributing and playing out ringtone. For example, if the calls are VoIP calls, the initiation of these calls may involve use of SIP and/or a SIP server, as well as other signaling protocols and devices. As an alternative to SIP, the call initiation may use Real Time Streaming Protocol (RTSP) or H.323 protocols and devices. On the other hand, the call initiation may use PSTN call establishment protocols, including Signaling System Number 7 (SS7). The use of any of these protocols may also involve one or more steps not shown in call flows 200 and 250.

FIGS. 2A and 2B merely provide examples of embodiments that fall within the scope of the invention. Therefore, the invention may also encompass other embodiments not explicitly set forth in these figures. For instance, call flows 200 and 250 may be combined in various ways to produce additional call flows that form further embodiments of the invention.

Figure 3:
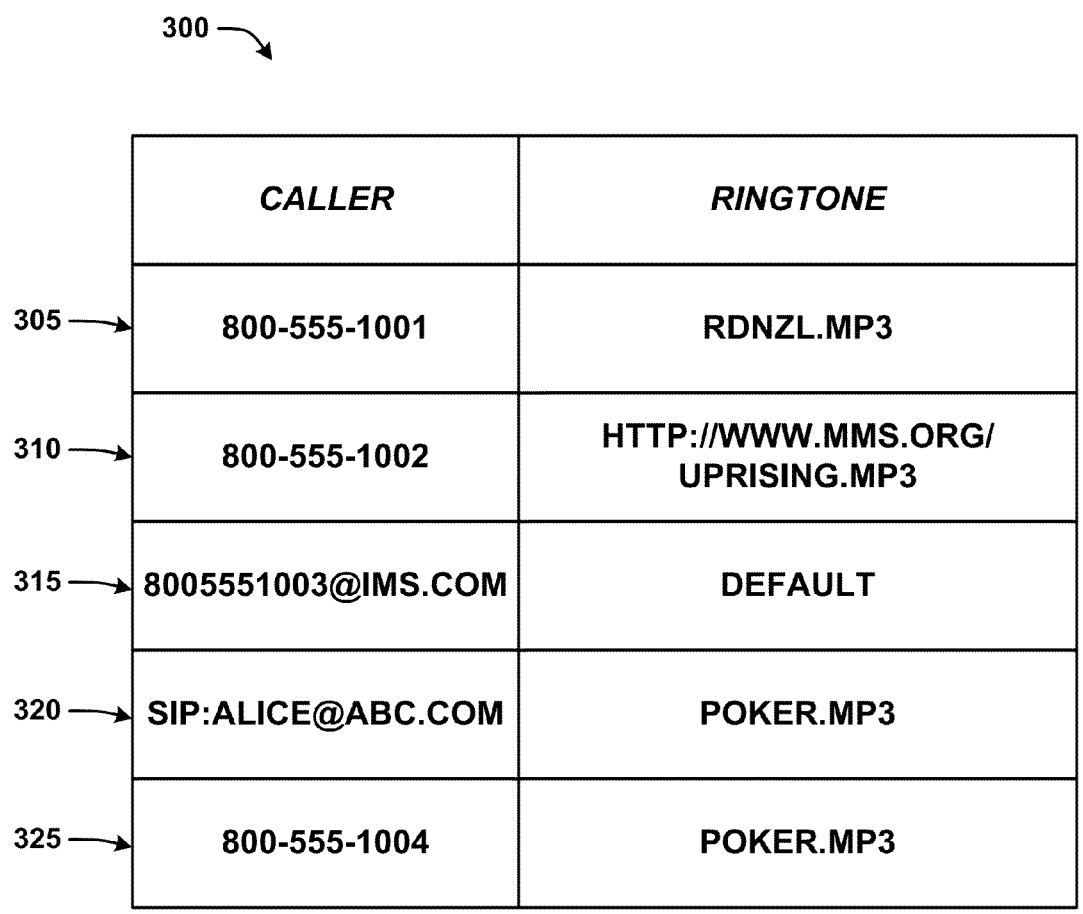
FIG. 3 depicts a trust group of a callee device in accordance with a preferred embodiment.

At steps 215 and 260 of call flows 200 and 250, respectively, callee device 130 forms an association between a ringtone and a caller device. Preferably, callee device 130 stores this association for at least a period of time, until the association is deleted, overwritten, or expires. FIG. 3 depicts a number of such associations in table 300, which may be stored in callee device 130.

Table 300 is arranged in two columns, one containing identifiers of caller devices, and the other containing references to associated ringtone files. Thus, for example, entry 305 associates a caller device having phone number 800-555-1001 with the ringtone file RDNZL.MP3. Preferably, the ringtone file RDNZL.MP3 is stored on callee device 130. Entry 310, associates a caller device having phone number 800-555-1002 with the ringtone address HTTP://WWW.MMS.ORG/UPRISING.MP3. Entry 315 associates a caller device having an NAI or email address of 8005551003@IMS.COM with a default ringtone. The default ringtone may be a predefined ringtone that callee device 130 plays out when no ringtone is specified for a given caller device. In this case, the user of callee device 130 may have overridden an automatically formed ringtone with the default ringtone.

Entry 320 associates a caller device having a SIP URI of SIP:ALICE@ABC.COM with the file POKER.MP3. Entry 325 associates a caller device having a phone number of 800-555-1004 also with the file POKER.MP3. Preferably, for purposes of efficiency, only one copy of the file POKER.MP3 is stored on callee device 130.

While table 300 provides several example associations that could be formed and stored on callee device 130, the scope of this invention is not limited by these examples. Thus, different types of caller device identifiers may be used, and ringtones may be specified in different ways. Furthermore, callee device 130 may store many more associations than shown in table 300. Moreover, other representations aside from that of a table may be possible.

Figure 4:
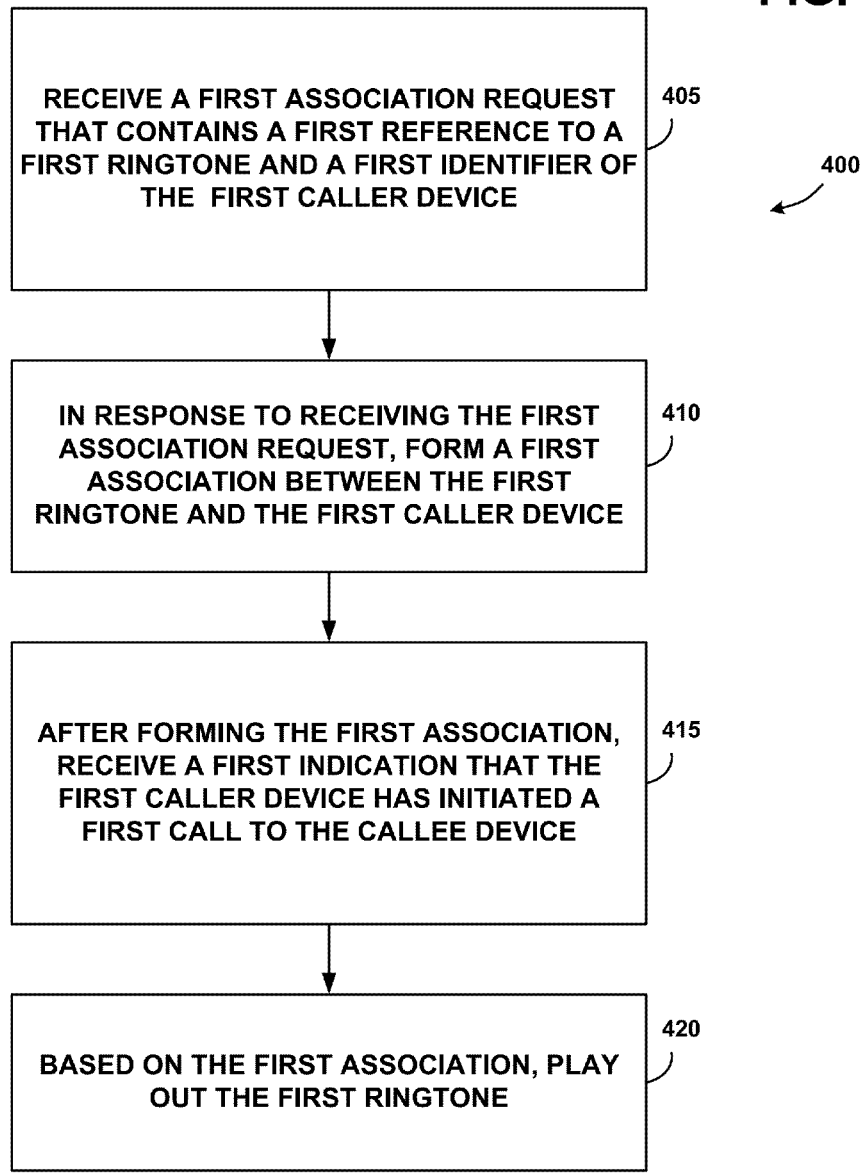
FIG. 4 is a flow chart of a method in accordance with a preferred embodiment.

To further illustrate this invention, the flow chart of FIG. 4 depicts a method in accordance with preferred embodiments. This method is represented by a sequence of steps or events. However, these steps or events may occur in a different order, and fewer or more steps or events may occur without departing from the scope of the embodiments.

FIG. 4 depicts a flow chart of method 400, where method 400 preferably takes place at a callee device, such as callee device 130. At step 405, the callee device receives a first association request. The first association request may have been transmitted by a first caller device or by a media server. Preferably, the first association request contains a first reference to a first ringtone, and a first identifier of the first caller device. The first reference may take various forms, including but not limited to that of a file containing the first ringtone, or a first address from which a file containing the first ringtone can be retrieved. The first identifier may include any means of identifying the first caller device. The first association request may be delivered in any type of message that the callee device is capable of receiving, include for instance, an IP-based message, an SMS message, or an MMS message.

At step 410, in response to receiving the first association request, the callee device may form a first association between the first ringtone and the first caller device. Forming the first association may involve the callee device querying a user of the callee device for permission to form the first association, the callee device receiving the permission from the user, and the callee device storing the first association. For instance, the first association may be stored in a table such as table 300. Alternatively, forming the first association may involve the callee device determining that the callee device and first caller device are members of a trust group, and then automatically forming the first association based on that determination. That is, the formation of the first association can be conditioned on user approval at the time first association is received, and/or on the caller device being in a trust group defined for the caller device.

Regardless of how the first association is formed, at some point after forming the first association, the callee device may also determine that the first reference takes the form of a first address rather than a file containing the first ringtone. Then, the callee device may download, in advance of receiving a call, the file from the first address, and store the file. Alternatively, the callee device may request and receive a stream of the file at the time of the call in order to play out the ringtone.

At step 415, after forming the association, the callee device may receive a first indication that the first caller device has initiated a first call to the callee device. At step 420, based at least on the earlier-established first association, and preferably also in response to receiving the first indication, the callee device may play out the first ringtone. The callee device playing out the first ringtone may include the callee device determining that the first reference is in the form of the first address and that the callee device has not yet downloaded the first ringtone from the first address. Then the callee device may request and receive a streamed representation of the first ringtone from the first address, and play out this streamed representation.

After step 420, the callee device may have additional interactions with the first caller device or other caller devices. For example, the callee device may associate a second ringtone with a second caller device. In this case, the callee device may receive a second association request that contains a second reference to a second ringtone and a second identifier of a second caller device. In response to receiving the second association request, the callee device may form a second association between the second ringtone and the second caller device. After forming the second association, the callee device may receive a second indication that the second caller device has initiated a second call to the callee device. Based on the established second association, the callee device may play out the second ringtone.

Additionally, the callee device may associate the same ringtone with more than one caller device. Thus, the callee device may receive a second association request that contains a second reference to the first ringtone and a second identifier of a second caller device. In response to receiving the second association request, the callee device may form a second association between the first ringtone and the second caller device. After forming the second association, the callee device may receive a second indication that the second caller device has initiated a second call to the callee device. Then, the callee device may play out the first ringtone.

Further, the callee device may receive association requests that result in the callee device forming multiple associations. For instance, the callee device may receive a second association request that contains a second reference and a third reference. The second reference may specify a second ringtone and a second identifier of a second caller device, and the third reference may specify a third ringtone and a third identifier of a third caller device. In response to receiving the second association request, the callee device may form a second association between the second ringtone and the second caller device, and a third association between the third ringtone and the third caller device. After forming the second association and the third association, the callee device may receive a second indication that the second caller device has initiated a second call to the callee device. Then, the callee device may play out the second ringtone.

III. Example Callee Device

Figure 5:
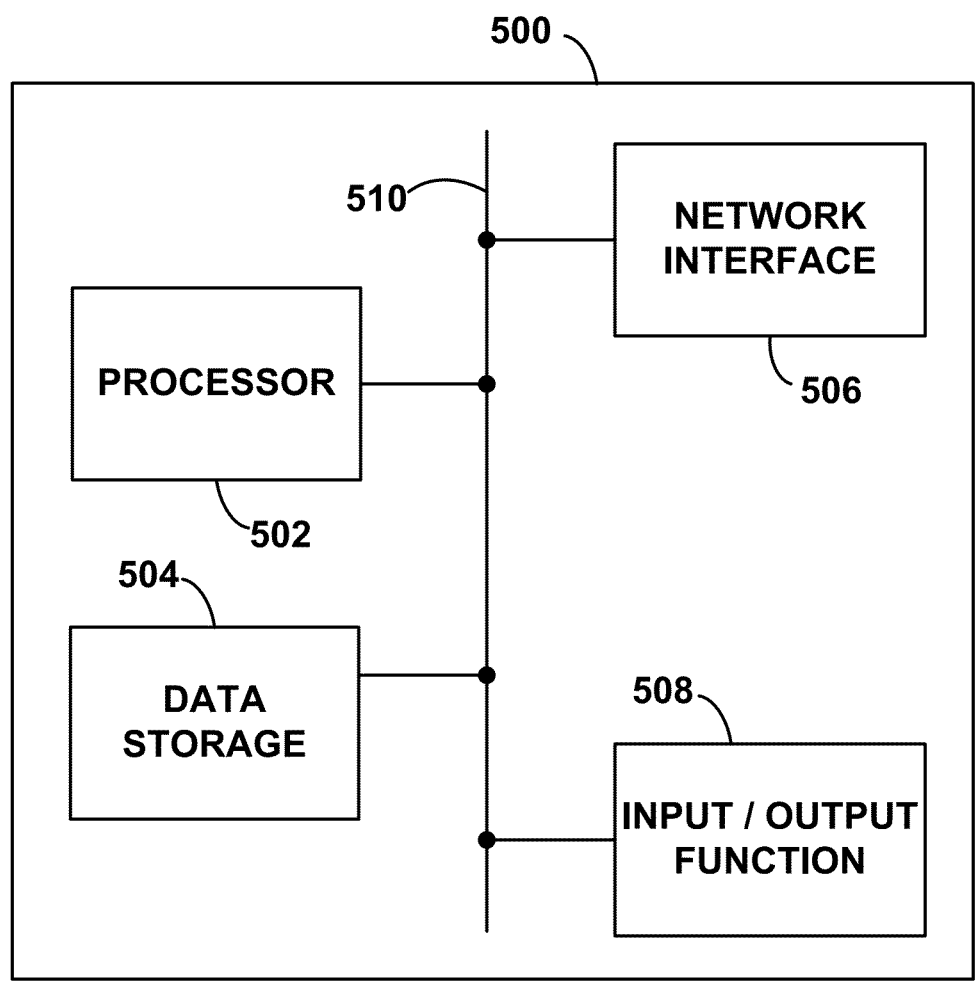
FIG. 5 is a block diagram of a callee device in accordance with a preferred embodiment.

FIG. 5 is a simplified block diagram exemplifying a callee device 500, and illustrating some of the functional components that would likely be found in a callee device arranged to operate in accordance with the embodiments herein. Example callee device 500 could be any type of device, such as a cellular telephone, that receives and maintains associations between ringtones and caller devices, and plays out particular ringtones when the callee device receives an incoming call indication from an associated caller device. However, example callee device 500 can take other forms as well.

Example callee device 500 preferably includes a processor 502, a data storage 504, a network interface 506, and an input/output function 508, all of which may be coupled by a system bus 510 or a similar mechanism. Processor 502 preferably includes one or more CPUs, such as one or more general purpose processors and/or one or more dedicated processors (e.g., application specific integrated circuits (ASICs) or digital signal processors (DSPs), etc.) Data storage 504, in turn, may comprise volatile and/or non-volatile data storage and can be integrated in whole or in part with processor 502.

Data storage 504 preferably contains program instructions executable by processor 502, and data that is manipulated by these instructions, to carry out the various methods, processes, or functions described herein. (Alternatively, these methods, processes, or functions can be defined by hardware, firmware, and/or any combination of hardware, firmware and software.)

Network interface 506 may take the form of a wireline connection, such as an Ethernet, Token Ring, or a T-carrier connection. Network interface 506 may also take the form of a wireless connection, such as IEEE 802.11 (Wifi), BLUE-TOOTH®, or a wide-area wireless connection. However, other forms of physical layer connections and other types of standard or proprietary communication protocols may be used over network interface 506. Furthermore, network interface 506 may comprise multiple physical interfaces.

Input/output function 508 facilitates user interaction with example callee device 500. Input/output function 508 may comprise multiple types of input devices, such as buttons, a keyboard, a mouse, a touch screen, and so on. Similarly, input/output function 508 may comprise multiple types of output devices, such as a screen, monitor, printer, or one or more light emitting diodes (LEDs). Additionally or alternatively, example callee device 500 may support remote access from another device, via network interface 506 or via another interface (not shown), such an RS-232 port.

By way of example, the data in data storage 504 may comprise one or more associations between ringtones and caller devices. Additionally, data storage 504 may also store copies of ringtone files to be played out when callee device 500 determines that it is receiving an incoming call indication from a caller device associated with one or more of the ringtone files.

Furthermore, data storage 504 may contain program instructions executable by processor 502 to carry out any of the methods, processes, or functions disclosed in this specification or the accompanying drawings.

IV. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method for associating a first ringtone with a first caller device, wherein a callee device and the first caller device are both communicatively coupled to a communication infrastructure, the method comprising:
the callee device receiving, via the communication infrastructure, a first association request, wherein the first association request contains a first reference to the first ringtone and a first identifier associated with the first caller device;
the callee device determining that the first identifier is in a trust group defined by the callee device, wherein the trust group contains a list of identifiers of caller devices trusted by the first callee device, and wherein the list of caller devices is based on contact information from a social networking account of the first callee device;
in response to receiving the first association request and the first identifier being in the trust group, the callee device forming a first association between the first ringtone and the first caller device;
after forming the first association, the callee device receiving, via the communication infrastructure, a first indication that the first caller device has initiated a first call to the callee device; and
based on the first association, the callee device playing out the first ringtone.

2. The method of claim 1, wherein the first reference to the first ringtone comprises a file containing the first ringtone.

3. The method of claim 1, wherein the first reference to the first ringtone comprises a first address from which the callee device can receive a file containing the first ringtone.

4. The method of claim 3, further comprising:
after forming the first association, the callee device (i) downloading the file containing the first ringtone from the first address, and (ii) storing the file containing the first ringtone.

5. The method of claim 3, wherein the callee device playing out the first ringtone comprises the callee device receiving a streamed representation of the first ringtone from the first address.

6. The method of claim 1, wherein receiving the first association request comprises receiving the first association request via one of a short messaging service (SMS) message and a multimedia messaging service (MMS) message.

7. The method of claim 1, wherein the callee device forming a first association between the first ringtone and the first caller device comprises:
the callee device querying a user of the callee device for permission to form the first association;
the callee device receiving the permission from the user; and
the callee device storing the first association.

8. The method of claim 1, wherein receiving the first association request via the communication infrastructure comprises receiving the first association request from the first caller device via the communication infrastructure.

9. The method of claim 1, wherein receiving the first association request via the communication infrastructure comprises receiving the first association request from a media server via the communication infrastructure.

10. The method of claim 1, further comprising:
the callee device receiving, via the communication infrastructure, a second association request, wherein the second association request contains a second reference to a second ringtone and a second identifier associated with a second caller device, wherein the second identifier is in the trust group;
in response to receiving the second association request and the second identifier being in the trust group, the callee device forming a second association between the second ringtone and the second caller device;
after forming the second association, the callee device receiving, via the communication infrastructure, a second indication that the second caller device has initiated a second call to the callee device; and
based on the second association, the callee device playing out the second ringtone.

11. The method of claim 1, further comprising:
the callee device receiving, via the communication infrastructure, a second association request, wherein the second association request contains a second reference to the first ringtone and a second identifier associated with a second caller device, wherein the second identifier is in the trust group;

in response to receiving the second association request and the second identifier being in the trust group, the callee device forming a second association between the first ringtone and the second caller device;

after forming the second association, the callee device receiving, via the communication infrastructure, a second indication that the second caller device has initiated a second call to the callee device; and based on the second association, the callee device playing out the first ringtone.

12. The method of claim 1, further comprising:

the callee device receiving, via the communication infrastructure, a second association request, wherein the second association request contains (i) a second reference to a second ringtone and a second identifier associated with a second caller device, wherein the second identifier is in the trust group, and (ii) a third reference to a third ringtone and a third identifier associated with a third caller device, wherein the third identifier is in the trust group;

in response to receiving the second association request and the second and third identifiers being in the trust group, the callee device (i) forming a second association between the second ringtone and the second caller device, and (ii) forming a third association between the third ringtone and the third caller device;

after forming the second association and the third association, the callee device receiving, via the communication infrastructure, a second indication that the second caller device has initiated a second call to the callee device; and based on the second association, the callee device playing out the second ringtone.

13. A callee device communicatively coupled to a communication infrastructure, wherein a first caller device is also communicatively coupled to the communication infrastructure, the callee device comprising:

a processor;

a data storage; and program instructions, stored in the data storage and executable by the processor, to (i) receive, via the communication infrastructure, a first association request, wherein the first association request contains a first reference to a first ringtone and a first identifier associated with the first caller device, (ii) determine that the first identifier is in a trust group defined by the callee device, wherein the trust group contains a list of identifiers of caller devices trusted by the callee device, and wherein the list of caller devices is based on contact information from a social networking account of the callee device (iii) in response to receiving the first association request and the first identifier being in the trust group, form a first association between the first ringtone and the first caller device, (iv) after forming the first association, receive, via the communication infrastructure, a first indication that the first caller device has initiated a first call to the callee device, and (v) based on the first association, play out the first ringtone.

14. The callee device of claim 13, wherein the first reference to the first ringtone comprises a first address from which the callee device can receive the first ringtone.

15. The callee device of claim 14, further comprising:

program instructions, stored in the data storage and executable by the processor, to, after forming the first association, download the first ringtone from the first address and store the first ringtone.

16. The callee device of claim 13, wherein receiving the first association request comprises receiving the first association request via one of a short messaging service (SMS) message and a multimedia messaging service (MMS) message.

17. The callee device of claim 13, wherein the callee device receives the first association request from one of the first caller device and a media server.

18. The callee device of claim 13, further comprising:

program instructions, stored in the data storage and executable by the processor, to (i) receive, via the communication infrastructure, a second association request, wherein the second association request contains a second reference to a second ringtone and a second identifier associated with a second caller device, wherein the second identifier is in the trust group, (ii) in response to receiving the second association request and the second identifier being in the trust group, form a second association between the second ringtone and the second caller device, (iii) after forming the second association, receive, via the communication infrastructure, a second indication that the second caller device has initiated a second call to the callee device, and (iv) based on the second association, play out the second ringtone.

* * * * *